US006979707B2

(12) United States Patent
Niinobe et al.

(10) Patent No.: US 6,979,707 B2
(45) Date of Patent: Dec. 27, 2005

(54) HIGH-PERMITTIVITY RUBBER COMPOUNDS AND POWER CABLE MEMBERS

(75) Inventors: Hiroshi Niinobe, Chiba (JP); Tohru Takahashi, Tokyo (JP); Kazuo Watanabe, Futtsu (JP); Shoutaroh Yoshida, Tokyo (JP)

(73) Assignee: Fujikura Ltd., Tokyo (JP)

( * ) Notice: Subject to any disclaimer, the term of this patent is extended or adjusted under 35 U.S.C. 154(b) by 57 days.

(21) Appl. No.: 10/388,664

(22) Filed: Mar. 17, 2003

(65) Prior Publication Data

US 2004/0186212 A1    Sep. 23, 2004

(51) Int. Cl.$^7$ .............................................. C08K 3/10
(52) U.S. Cl. ...................................................... 524/436
(58) Field of Search ......................................... 524/436

(56) References Cited

U.S. PATENT DOCUMENTS

| | | | | |
|---|---|---|---|---|
| 4,132,858 A | * | 1/1979 | Anderson et al. | 174/120 SR |
| 5,171,940 A | | 12/1992 | Vallauri | 174/73.1 |
| 5,294,752 A | | 3/1994 | Vallauri et al. | 174/73.1 |
| 5,365,020 A | | 11/1994 | Vallauri et al. | 174/73.1 |
| 5,844,170 A | | 12/1998 | Chor et al. | 174/74 A |
| 6,171,669 B1 | | 1/2001 | Vallauri et al. | 428/34.9 |
| 6,281,442 B1 | | 8/2001 | Guzowski | 174/73.1 |
| 6,340,794 B1 | * | 1/2002 | Wandmacher et al. | 174/73.1 |

FOREIGN PATENT DOCUMENTS

| | | |
|---|---|---|
| JP | 64-050712 | 2/1989 |
| JP | 08-022716 | 1/1996 |
| JP | 08-050807 | 2/1996 |
| JP | 11-041779 | 2/1999 |
| JP | 2000-166075 | 6/2000 |
| JP | 2000-175343 | 6/2000 |
| JP | 2000-175344 | 6/2000 |
| JP | 2000-1888222 | 7/2000 |
| JP | 2000-299920 | 10/2000 |
| JP | 2000-312430 | 11/2000 |
| JP | 2001-069658 | 3/2001 |
| JP | 2001-126562 | 5/2001 |
| JP | 2002-281652 | 9/2002 |

* cited by examiner

Primary Examiner—Peter D. Mulcahy
(74) Attorney, Agent, or Firm—Oblon, Spivak, McClelland, Maier & Neustadt, P.C.

(57) ABSTRACT

A high-permittivity rubber compound (MX) to be over 10, 15, or 20 in relative permittivity is produced by filling, to 100 weight parts of base material (M10), 300 or more, 400 or more, or 500 or more weight parts of barium titanate family material as powder (M11) over 2000 in relative permittivity at temperatures from room temperature to 90° C. A high-permittivity rubber compound (M30, M60) crosslinked by peroxide is heat-treated (S21, S31) to remove decomposition residue of the peroxide, and powder (BT4) of barium titanate family material of industrial grade is washed (S09) by de-ionized water (Mc) to remove ionic impurities, suppressing degradation of insulating characteristics.

8 Claims, 4 Drawing Sheets

FIG.2

| No | BARIUM TITANATE | | PROCESSES | RELATIVE PERMITTIVITY | DIELECTRIC LOSS TAN, % | INSUL. RESISTANCE, Ω/cm | BREAKDOWN VOL, kV/mm |
|---|---|---|---|---|---|---|---|
| | KINDS | FILLING (WT PARTS) | | | | | |
| 1 | A | 650 | — | 11 | 13 | $6.2 \times 10^{12}$ | 23 |
| 2 | B | 450 | — | 11 | 3 | $1.3 \times 10^{14}$ | 46 |
| 3 | C | 300 | — | 11 | 1.2 | $6.5 \times 10^{14}$ | 48 |
| 4 | C | 500 | — | 16 | 2.1 | $1.5 \times 10^{14}$ | 47 |
| 5 | C | 750 | — | 30 | 15 | $5.8 \times 10^{12}$ | 22 |
| 6 | C | 750 | HEATING | 28 | 0.9 | $1.4 \times 10^{15}$ | 50 |
| 7 | C | 750 | HEATING+ WASHING | 28 | 0.9 | $4.3 \times 10^{15}$ | 55 |

HIGH-PERMITTIVITY RUBBER COMPOUNDS AND POWER CABLE MEMBERS

BACKGROUND OF THE INVENTION

1. Field of the Invention

The present invention relates to a high-permittivity rubber compounds and power cable members.

2. Description of Relevant Art

The XLPE (crosslinked polyethylene) cable, applicable as a power cable for general purposes, has at its connected or terminated portion various insulated or insulating parts (e.g., inner electrode layer, semi-conductive outer electrode layer, stress cone with a rise, and boundaries between cable core and connection elements), where the insulation is effected with materials installed therefor (e.g., fitted rubber mold, wound rubber tape, or filled epoxy resin) sometimes by on-site work, which may be manual.

Forming insulation layers by manual work tends to accompany on the boundary certain singular points very large or disconnected of curvature, such as a small projection, foreign material, or void, causing the electric field in insulation layer to be steep of gradient about such singular points, needing careful attention and qualified skill in order to achieve a secure prevention of dielectric breakdown, resulting in increase in cost and time for installation.

To this point, using an insulator high of permittivity allows for the electric field to moderate in gradient. It was examined in the past to use as an insulator a rubber compound having a relative permittivity increased by filling a conductive filler such as carbon black, or a rubber compound inherently high of permittivity, such as an acrylic rubber or fluororubber.

The filling of conductive filler formed a chain of conductive particles. The use of a rubber compound inherently high of permittivity, of which polymer has a prominent polarity, brought a fall in dielectric loss tangent, as well as in dielectric breakdown voltage or insulation resistance. In either case, the insulation performance was significantly degraded, as a problem.

It was tried to provide a rubber compound filled with a filler relatively high of relative permittivity, such as barium titanate or titanium oxide. However, as the amount of filler was simply increased, the rubber compound had an increased permittivity, with significant degradation of insulation performance, as a problem.

SUMMARY OF THE INVENTION

The present invention is made with such points in view. It therefore is an object of the invention to provide a high-permittivity rubber compound and power cable members, allowing for the permittivity to be increased without significant degradation of insulation performance.

To achieve the object, according to an aspect of the invention, a high-permittivity rubber compound is produced by a process comprising the steps of providing a base material comprising a rubber family polymer, providing a finer comprising powder of a material of a barium titanate family having a relative permittivity within a range over 2000 at temperatures between a room temperature and 90° C., and filling the filler to the base material, thereby producing a rubber compound having a high permittivity corresponding to a relative permittivity within a range over 10.

The relative permittivity of the rubber compound may preferably reside within a range over 15, and more preferably, within a range over 20.

The step of providing the base material may preferably comprise the, steps of shifting a Curie temperature of the material of the barium titanate family by addition of a shifter, and washing the material of the barium titanate family by de-ionized water to remove ionic impurities.

The process may preferably further comprise the steps of crosslinking rubber family polymers in the rubber compound by a peroxide, and thermally treating the rubber compound to remove a decomposition residue of the peroxide resulted from the crosslinking.

Further to achieve the object, according to another aspect of the invention, a power cable member comprises a high-permittivity rubber compound according to that aspect.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 2 is a listing of test results of a number of high-permittivity rubber compounds produced by the process of FIG. 1;

DETAILED DESCRIPTION OF THE PREFERRED EMBODIMENTS

Figure 1:
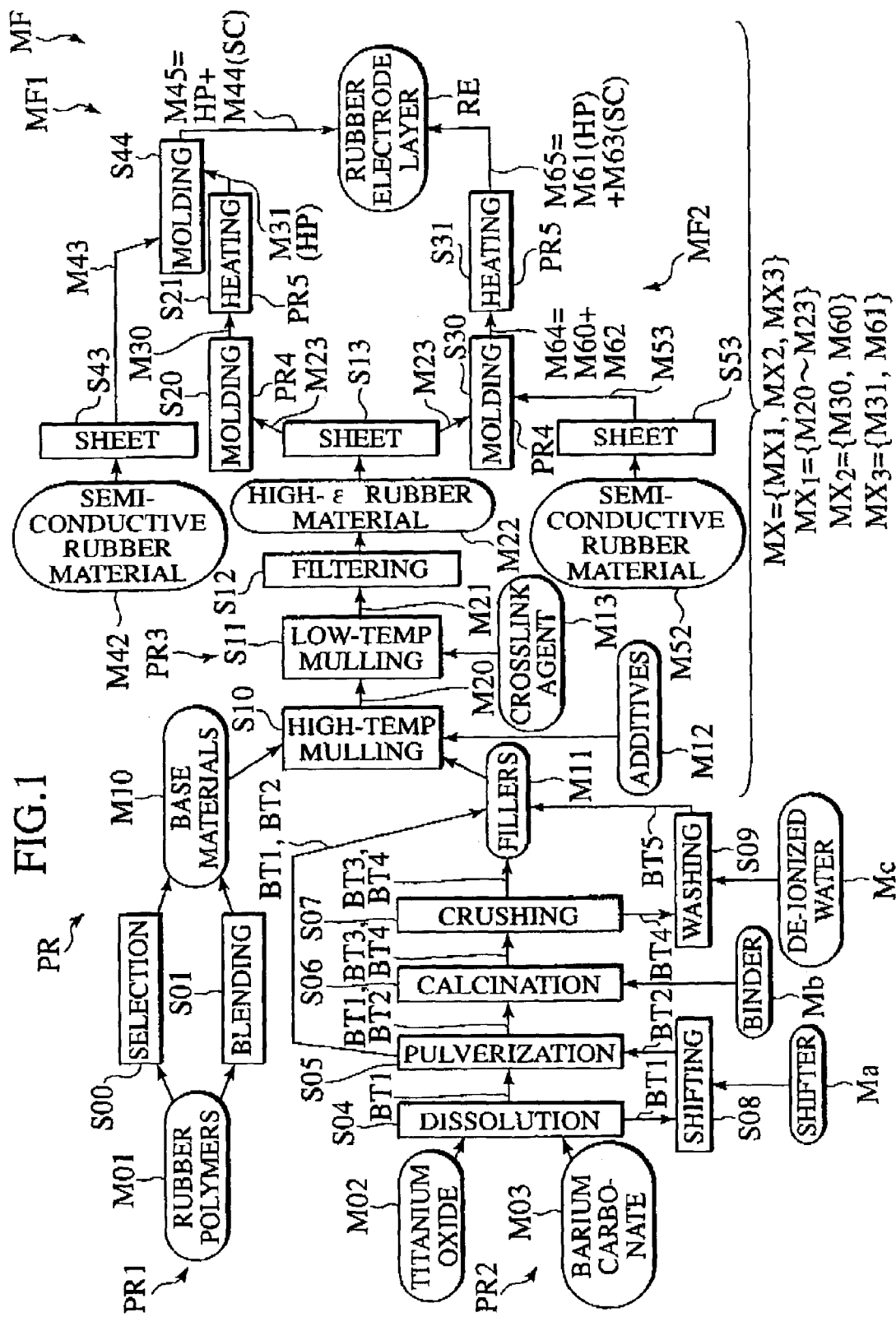
FIG. 1 is at illustrative diagram of combination of a process for producing high-permittivity rubber compounds and a procedure for manufacturing a cassette-type electrode layer for power cables according to an embodiment of the invention.

There will be detailed below the preferred embodiments of the present invention with reference to the accompanying drawings. Like members are designated by like reference characters.

FIG. 1 illustrates combination of a production process PR for producing a group of rubber compounds MX high of permittivity (over 10 in relative permittivity) according to an embodiment of the invention, and a manufacturing procedure MF of a cassette-type electrode layer RE for power cables, as this procedure MF includes part of that process PR.

As in this embodiment, the term "high-permittivity rubber compound" MX collectively refers to a later-described non-crosslinked high-permittivity rubber material (hereinafter sometimes called "non-crosslinked rubber material") MX1, a crosslinked high-permittivity rubber material before heat treatment (hereinafter sometimes called "crosslinked rubber material") MX2, and a crosslinked high-permittivity rubber material after heat treatment (hereinafter sometimes called "heat-treated rubber material") MX3. The cassette-type electrode layer RE of this embodiment is identical in constitution and configuration to a combination of inner semi-conductive rubber layer SC (or SC1) and high-permittivity rubber layer HP (or HP1) in a later-described embodiment. It is noted that even materials of a high-permittivity rubber will be called herein by different names between when referred to as a chemical rubber compound MX and when referred to as part of work in manufacture of the electrode layer RE.

The production process PR of high-permittivity rubber compound MX includes: a first process PR1 for providing a base material $M10=\{M10_j: j=1\sim J \text{ (integer)}\}$ of rubber compound MX; a second process PR2 for providing a filler $M11=\{M11_k: k=1\sim K \text{ (integer)}\}$ to be filled to the base material M10; a third process PR3 for producing a non-crosslinked rubber material MX1 by filling the filler M11 to the base material M10, while adding thereto additives $M12=\{M12_{n,m}: n=1\sim N \text{ (integer)}, m=1\sim M \text{ (integer)}\}$ and a crosslinking agent $M13=\{M13_p: p=1\sim P \text{ (integer)}\}$; a fourth process PR4 as a crosslinking treatment for crosslinking the non-crosslinked rubber material MX1 to provide a crosslinked rubber material MX2; and a fifth process PR5 as a thermal treatment for heat-treating the crosslinked rubber material MX2 to provide a heat-treated rubber material MX3.

The manufacturing procedure MF of electrode layer RE is arranged as a combination of two different procedures: a sequential molding procedure MF1 which molds, first, a high-permittivity rubber layer HP using as a molding material therefor a high-permittivity rubber material M22 to be provided as an example of non-crosslinked rubber material MX1, and then, a semi-conductive rubber layer SC using as a molding material therefor a semi-conductive rubber material MS0 to be provided separately; and an integral molding procedure MF2 which concurrently molds high-permittivity rubber layer HP and semi-conductive rubber layer SC. Accordingly, each of the sequential molding procedure MF1 and the integral molding procedure MF2 involves the fourth process PR4 (crosslinking treatment) and the fifth process PR5 (thermal treatment) of the production process PR of high-permittivity rubber compound MX.

The first process PR1 for providing a base material $M10_j$ includes: a selection step S00 in which, from among a group of rubber family polymers $M01=\{M01_i: i=1\sim I \text{ (integer)}\}$, one kind of polymer $M01_i$ (i=1 in this embodiment) is selected to be used as the base material $M10_j$(j=1); and a blending step S01 in which two or more kinds of polymers $M01_i$ (i=1~I) are selected and blended together to be used as the base material $M10_j$ (j=2~J).

The group of rubber family polymers M01 includes non-crosslinked rubber family polymers, such as ethylene-propylene rubber polymer (i=1, EPDM as ethylene-propylene copolymer with side chains double-bonded to be crosslinkable), silicon rubber polymer (i=2, Q with crosslinkable side chains), and butyl rubber polymer (i=3, IIR copolymerized with crosslinkable isoprene), as they are processed adaptive materials in the form of ribbon, lump, pellet, or powder, for example.

The second process PR2 for providing a filler $M11_k$ includes: a dissolution step S04 in which a titanium oxide material M02, prepared as powder of titanium oxide crystal, is dissolved in a water solution of a barium carbonate material M03, prepared as powder of barium carbonate crystal, to obtain crystal of barium titanate high of permittivity; a shifting step S08 in which, to a material BT1 made of barium titanate crystal obtained by the dissolution step S04, there is added a shifting agent Ma, such as a strontium family shifter (identical in element constitution to $SrTiO_3$) or zirconium family shifter (identical in element constitution to $ZrTiO_3$), for shifting the Curie temperature (max. about 120° C.) where the barium titanate crystal transits from a ferroelectric to a paraelectric, to provide a high-permittivity barium titanate family material BT2 of an industrial grade having a maximum permittivity shifted in a vicinity of room temperature; and a pulverization step S05 in which the material BT1 made of barium titanate crystal obtained by the dissolution step S04 or the barium titanate family material BT2 obtained by the shifting step S08 is pulverized to provide the filler $M11_k$ (k=1 or 2, k=2 in this embodiment).

It is preferable to proceed, after the pulverization step S05, via: a calcination step S06 in which the material BT1 or BT2 of barium titanate family obtained there (S05) as powder is solidified as a mold by using a binder Mb and calcined; and a crushing step S07 in which the material calcined at the calcination step S06 is crushed to be atomized, to provide powder of a barium titanate family material BT3 (atomized BT1) or BT4 (atomized BT2) as the filler $M11_k$ (k=3 or 4). It is more preferable and followed in this embodiment to proceed, after the crushing step S07, via a washing step S09 in which the material BT4 of barium titanate family obtained there (S07, via S08) as powder is washed with de-ionized water Mc, thereby removing ionic impurities, to provide powder of a barium titanate family material BT5 (washed BT4) as the filler $M11_k$ (k=5[=K]).

The third process PR3 for producing non-crosslinked rubber material MX1 includes: a high-temperature mulling step S10 in which a required quantity (to be 100 weight parts, as assumed herein) of base material M10 provided by the first process PR1 is mulled at a relatively high temperature, together with an adequate quantity of filler M11 provided by the second process PR2 and filled thereto (within a range of 300 to 750 weight parts, depending on the permittivity of filler M11 and desired properties of rubber compound MX) and necessary quantities of additives M12 added thereto, to provide a mulled rubber material M20 with no crosslinking agent added; a low-temperature mulling step S11 in which the mulled rubber material M20 is mulled at a relatively low temperature, together with crosslinking agent M13 added thereto, to provide a mulled rubber material M21 in a non-crosslinked state; and a filtering step S12 in which the mulled rubber material M21 is filtered, through a screen of a predetermined mesh size for removing foreign materials, to thereby provide the before-mentioned non-crosslinked high-permittivity rubber material M22.

The additives $M12=\{M12_{n,m}\}$ may cover; a group (n=1) of additives $\{M12_{1,m}\}$ for adjusting mechanical properties of the high-permittivity rubber material M22; a group (n=2) of additives $\{M12_{2,m}\}$ for adjusting electrical properties of the high-permittivity rubber material M22; and a group (n=3) of additives $\{M12_{3,m}\}$ for adjusting chemical properties of the high-permittivity rubber material M22, while the kind (n) and description (m) is selective and the quantity of addition thereof is variable in accordance with desired properties of the rubber material M22 to be obtained. The group of mechanical property adjusting additives $\{M12_{1,m}\}$ may include a softening agent $M12_{1,1}$ (e.g. process oil), a reinforcing agent $M12_{1,2}$ (e.g. inorganic filler such as clay), a slip agent $M12_{1,3}$ (e.g. paraffin, stearic acid), and a tensile property supporting agent $M12_{1,4}$ (e.g. silica or white carbon). The group of electrical property adjusting additives $\{M12_{2,m}\}$ may include an insulation property stabilizer $M12_{2,1}$ (e.g. dielectric loss tangent improving agent such as red lead paste). The group of chemical property adjusting additives $\{M12_{3,m}\}$ may include an anti-aging agent $M12_{3,1}$ (e.g. phenolic to antioxidant).

The crosslinking agent {M13$_p$} may include a crosslinking agent M13$_1$ (e.g. peroxide such as dicumyl peroxide), and sulfur M13$_2$.

In the manufacturing procedure MF, the sequential molding procedure MF1 and the integral molding procedure MF2 each respectively start with: a high-permittivity rubber sheet making step S13 in which the high-permittivity rubber material M22 is rolled and cut in a predetermined size to make an adequate number of high-permittivity rubber sheets M23; and a semi-conductive rubber sheet making step S43 or S53, as a parallel step thereto (to S13), in which a semi-conductive rubber material M42 or M52 provided with required properties is rolled and cut in a predetermined size to make an adequate number of semi-conductive rubber sheets M43 or M53.

The sequential molding procedure MF1 include: a first molding step S20 in which a required number of high-permittivity rubber sheets M23 are set in a molding die for high-permittivity rubber layer HP and heated to a high temperature, to be crosslinked and molded, to make a high-permittivity rubber mold M30; a hearing step S21 in which the high-permittivity rubber mold M30 is heat-treated at a suitable temperature for removing a residue of peroxide (as crosslinking agent) M13$_1$ decomposed when crosslinking (i.e. by product of crosslinking agent M13), and then the rubber mold M30 is dried, to provide a heat-treated high-permittivity rubber mold M31 (i.e. high-permittivity rubber layer HP); and a second molding step S44 as a subsequent step in which the rubber mold M31 and a required number of semi-conductive rubber sheets M43 are set in a molding die for semi-conductive rubber layer SC, and heated (for M43) to be molded, to thereby fabricate (a rubber electrode layer RE as) a combination M45 of high-permittivity rubber layer HP and a semi-conductive rubber mold M44 (i.e. semi-conductive rubber layer SC).

The integral molding procedure MF2 include: a single molding step S30 in which a required number of high-permittivity rubber sheets M23 and a required number of semi-conductive rubber sheets M53 are set in a molding die for rubber electrode layer RE and heated to a high temperature, to be crosslinked and molded, to thereby fabricate a mold M64 of rubber electrode layer as a combination of a high-permittivity rubber mold M60 (corresponding to M30 after S20) and a semi-conductive rubber mold M62 (corresponding to M44 after S44) integrated therewith; and a heating step S31 in which the rubber mold M64 is heat-treated at a suitable temperature for removing a decomposition residue of peroxide M13$_1$ after the crosslinking, and then the rubber mold M64 is dried, to provide an electrode layer mold M65 (i.e. rubber electrode layer RE) as a combination of a heat-treated high-permittivity rubber mold M61 (i.e. high-permittivity rubber layer HP) and a semi-conductive rubber mold M63 (i.e. semi-conductive rubber layer SC).

The crosslinking treatment (PR4) of non-crosslinked rubber material in the production process PR of high-permittivity rubber compound is involved in the molding step S20 or S30 of the manufacturing procedure MF, and the thermal treatment (PM) of crosslinked rubber material in the production process PR is involved in the heating step S21 or S31 of the manufacturing procedure MF. In the heating step S21 or S31, the rubber mold M30 or M60 is heated for 6 hours~24 hours, at temperatures of 100° C.~140° C., in dry air or inactive atmosphere such as nitrogen, as necessary.

It is noted that, among high-permittivity rubber compounds MX described (i.e. {M20, M21, M22, M23, M30, M31, M60, and M61}), rubber compounds M20 to M23 belong to the non-crosslinked rubber material MX1, rubber compounds M30 and M60, to the crosslinked rubber material MX2, and rubber compounds M30 and M61, to the heat-treated rubber material MX3.

The high-permittivity rubber sheet M23 may be cut in predetermined width and length, and provided with an adequate adhesivity, such as for production of a rubber ribbon or rubber tape to be wound by hands for insulation, or the high-permittivity rubber material M22 may be utilized as a gel material for insulation.

The semi-conductive rubber material M42 or M52 may also be produced from the base material M10, by adding thereto the additives M12 and the crosslinking agent M13, while filling carbon black.

Power cable members may preferably be constituted with a high-permittivity rubber compound that has polymers thereof crosslinked by peroxide (e.g. dicumyl peroxide) in consideration of mechanical properties (e.g. tensile strength, elongation, and permanent compression strain), workability, Cost, etc., in particular by use of a rubber compound based on ethylene-propylene copolymer (EPDM) and crosslinked by peroxide.

The filler M11 may preferably be provided as powder of barium titanate family material 1~10 μm in particle diameter, with relative permittivity within a range over 2,000 (more preferably, between 2,000 and 20,000), at temperatures within a range from room temperature (about 25° C.) to 90° C., that is a working temperature range of power cable.

If the relative permittivity of filler M11 is under 2,000, the quantity to be filled to base material M10 increases when compared with the case over 2,000, so that obtained high-permittivity compound MX is degraded in electrical characteristics such as dielectric loss tangent (tan δ), insulation breakdown voltage (BDV), and insulation resistance (ρ).

The barium titanate family material can be produced with a diversity of grades, and may preferably be provided as material BT2, BT4, or BT5 of an industrial grade that has an increased permittivity by addition of a shifting agent such as a strontium family shifter or zirconium family shifter.

Among the materials (BT2, BT4, BT5) of industrial grade, those (BT2, BT4) not subjected to the washing step S09 contain ionic impurities.

Such ionic impurities cause lowered electrical characteristics (tan δ, BDV, ρ) in a low frequency range covering commercial frequencies employable in power cables using high-permittivity rubber compound MX.

It therefore is preferable to select the filler M11$_k$ (k=5) that is powder of barium titanate family BT5 produced via the washing step S09, where ionic impurities are washed away by de-ionized water Md. The washing step S09 may preferably include ultrasonically washing the material in de-ionized water.

The relative permittivity of high-permittivity rubber compound MX is controllable within a range over 10, 15, or 20 by filling, in terms of weight part, 300 or more (preferably 400 or more), 400 or more (preferably 500 or more), or 500 or more (preferably 600 or more) filler M11, respectively, to 100 base material M10. If the quantity of filler M11 is under 300) in weight part, the rubber compound MX has an insufficient permittivity. In those cases in which the quantity of filler M11 exceeds 400 (in particular 500) in weight part, it is necessary to consider the balance with degradation of insulation properties of rubber compound MX, such as dielectric loss tangent, insulation breakdown voltage, and insulation resistance.

In this respect, the inventors have empirically proved that, in those cases in which a rubber compound MX crosslinked by peroxide M13 contains an excessive amount of barium titanate family material BT2 or BT4 of industrial grade, the degradation of insulation properties is caused not simply by electrical conduction of ionic impurities adhering to the material BT2 or BT4, but also by interfacial polarization due to a complex action between the ionic impurities and residues of decomposed crosslinking agent M13, as they are left in the crosslinked rubber compound MX (e.g. acetophenone and cumylalcohol left after a crosslinking by dicumylperoxide).

This means that it is preferable, when balancing the permittivity of high-permittivity rubber compound MX with the insulation properties, to employ as a filler the powder $M11_k$ (k=5) of barium titanate family material BT5 from which ionic impurities are removed, in order for the rubber compound MX to have an increased permittivity, and that it is more preferable to additionally remove decomposition residue of crosslinking agent at the above-noted heating step S21 or S31.

FIG. 2 shows a listing of seven actual examples No. 1~No. 7 of high-permittivity rubber compound MX using ethylene-propylene rubber polymer $M01_i$ (i=1) as a base, and test results of their electrical characteristics.

The examples No. 1~No. 7 of high-permittivity rubber compound were produced by adding, to 100 weight parts of base material $M10_1$, adequate amounts of additives M12 including process oil and antioxidant and 4 weight parts of dicumylperoxide as crosslinking agent M13, and filling thereto 300 weight pans (for example No. 3), 450 weight parts (for example No. 2), 500 weight parts (for example No. 4), 650 weight parts (for example No. 1), or 750 weight parts (for examples No. 5 to No. 7) of any of the following three kinds (A, B, C) of barium titanate family materials as powder M11:

Powder A: BT335 (commercial article) by Fuji Titan Kogyo Relative permittivity 1,600 (room temp. ~90° C.)

Powder B: BT325 (commercial article) by Fuji Titan Kogyo Relative permittivity 4,000 (room temp. ~90° C.)

Powder C: BT206 (commercial article) by Fuji Titan Kogyo Relative permittivity 16,500 (room temp) 3,000 (90° C.)

Examples No. 6 and No. 7 were subjected to heating step S21 or S31 (at 120° C., 12 hours), where decomposition residues of crosslinking agent M13 were removed. For example No. 7, employed filler (powder C) was subjected to washing step S09, where it was washed with de-ionized water Md and dried.

For each example No. 1~No. 7, a corresponding high-permittivity rubber material M22 obtained in production process PR3 of non-crosslinked rubber material MX1 was molded into a number of 2-mm thick flat sheets and crosslinked to prepare test samples, of which the relative permittivity, dielectric loss tangent, and insulation resistance were measured. Further, for measurement of insulation breakdown voltage, there were prepared a number of test samples generally sheet-shaped to an effective thickness of 0.5 mm and partially configured with a recess.

The permittivity and dielectric loss tangent were measured under conditions of 50 Hz, 1 kV, and the insulation resistance was measured for a 1 minute value under a condition of dc 500 V. The insulation breakdown voltage was measured for 50 Hz, at voltages stepwise increased by 2 kV per 5 minutes.

Power cable members according to the invention are constituted with high-permittivity rubber compound MX described, in particular by use of high-permittivity rubber material M22. In other words, in termination such as for connection of power cables, the non-Crosslinked rubber material MX1 (as a material to be wound by hands or to be molded, or as a sequentially or simultaneously integrated mold thereof with semi-conductive rubber material M42 or M52) is arranged as an electric field moderating layer typically 1-mm~5-mm thick and sometimes thicker, such as for electrode insulation, stress cone erection, or interface formation, Such power cable members are high of permittivity, to be over 10, 15, or 20 in relative permittivity, and free from degradation of electrical characteristics such as dielectric loss tangent, insulation breakdown voltage, and insulation resistance.

Therefore, in termination of power cables, even with occurrences of singular points such as by projection, foreign material, or void, the gradient of electric field to be developed thereabout can be moderated by cable members described, with successful prevention against occurrences of defective events such as discharge. Accordingly, power cable connection can be free from troublesome work that needs a qualified skill.

Figure 3:
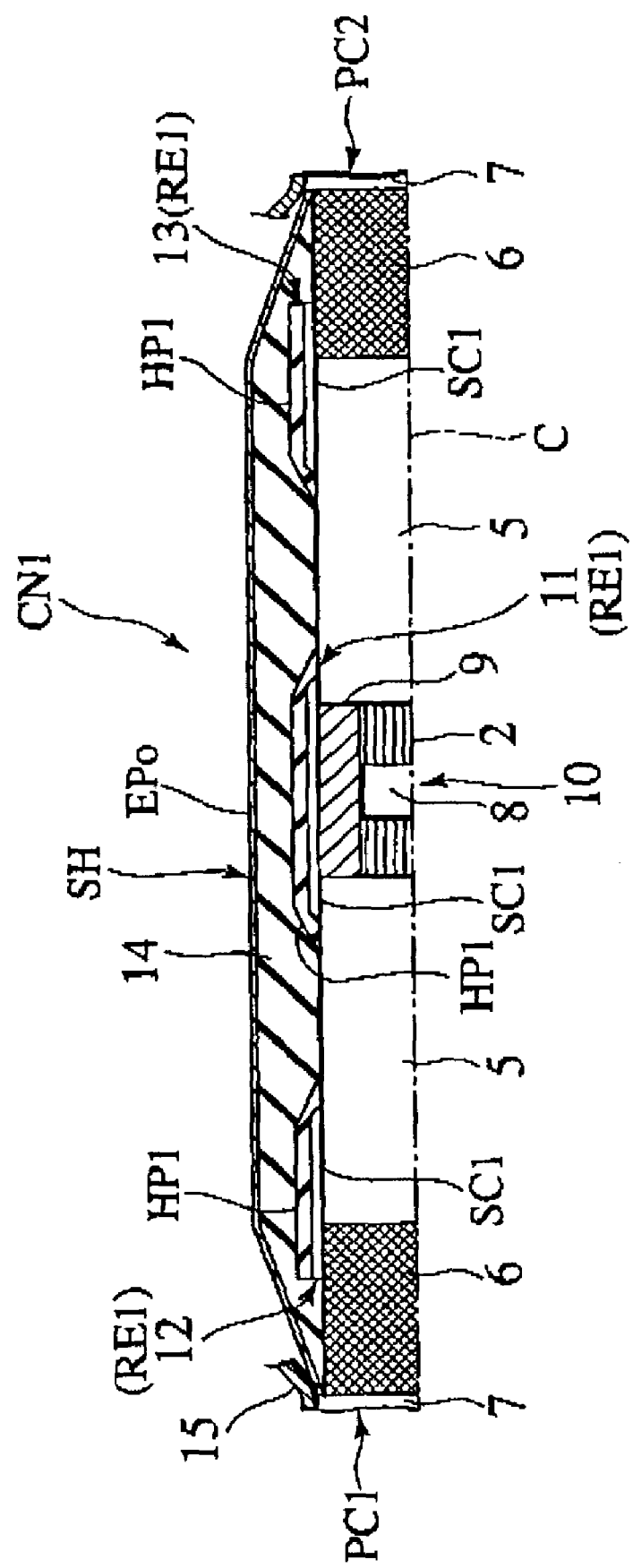
FIG. 3 is a section of a power cable connection structure including an electrode layer according to an embodiment of the invention.

FIG. 3 shows a connection structure CN1 for a pair of plastic-insulated power cables PC1 and PC2 according to an embodiment of the invention.

The connection structure CN1 includes: a transmission portion 10 configured for electrical connection between stripped conductors 2 and 2 of power cables PC1 and PC2 at the left and right; a screening portion SH configured for electrical connection between stripped screens 6 and 6 of power cables PC1 and PC2; an insulating portion 14 formed between the transmission portion 10 and the screening portion SH and configured to conformingly fit on stripped crosslinked-plastic insulators 5 and 5 of power cables PC1 and PC2; and at two-piece separable protection case 15 configured to water-tightly fit on outer covers 7 and 7 of power cables PC1 and PC2, covering an outer periphery of the screening portion SH.

The transmission portion 10 is configured with a tubular conductor 8 fit on ends of the cable conductors 2 and 2, a layer 9 of conductive rubber tape wound-fit on the tubular conductor 8 and remaining stripped parts of the cable conductors 2 and 2, and a relatively thin cylindrical rubber electrode 11 disposed in a central part of an inner periphery of the insulating portion 14 and fit conforming on the wound layer 9 of rubber tape and ends of the cable insulators 5 and 5.

The screening portion SH is configured with thin cylindrical rubber electrodes 12 and 13 disposed near left and right ends of the inner periphery of insulating portion 14 and electrically contacting on the cable screens 6 and 6, and an outer electrode EPo made by a layer of semi-conductive rubber tape or aluminum foil wound at the working site on the entirety of an outer periphery of the insulating portion 14.

The insulating portion 14 is formed by winding a rubber tape about the rubber electrodes 11, 12, and 13 up to a prescribed insulation thickness. It is thus formed as a tubular rubber insulator tapered at both ends, and fit on the cable insulators 5 and 5, for insulation between the rubber electrodes 11, 12, and 13. This rubber insulator may be molded by filling a rubber in a die.

The rubber electrodes 11, 12, and 13 are constituted as tubular rubber electrode layers RE1 (to be RE in collective description herein) extending along the inner periphery of insulating portion 14 and spaced from each other. Each rubber electrode RE1 is configured with a sheet-shaped semi-conductive rubber layer SC1 (to be SC in collective description herein), and a high-permittivity rubber layer HP1 (to be HP in collective description herein) molded on the entirety of an outer periphery of the semi-conductive rubber layer SC1 or about an electrode edge thereof formed with a curvature.

The semi-conductive rubber layer SC1 may preferably be configured at a side part thereof to penetrate or extend to the interior of high-permittivity rubber layer HP1. In this case, the penetrating or extending length of semi-conductive rubber layer SC1 may preferably be set to 10 mm or less, and the remaining axial length of high-permittivity rubber layer HP1 may preferably be set within a range over 5 mm, to an adequate dimension determined by an electric field analysis so that the electric stress concentration is kept under a critical value.

It is noted that, in place of the protection case 15, there may preferably be employed a structure in which a thermally shrinkable tube made of polyethylene or equivalent is fit water-tight on the screening portion SH, or a structure in which the screening portion SR is covered by a glass-fiber reinforced epoxy resin tube, with a compound filled water-tight in between.

In addition, the high-permittivity rubber layer HP1 can achieve the control of electric stress concentration at a successfully effective level in practice, providing that it has a high relative permittivity ($\epsilon_h$) equal to or greater than a relative permittivity ($\epsilon_c$) of cable insulator times five. For example, for a typical $\epsilon_c=2.3$, the high-permittivity $\epsilon_h$ may well be 15 to practically achieve a definite reduction in thickness of pre-molded connection member.

Figure 4:
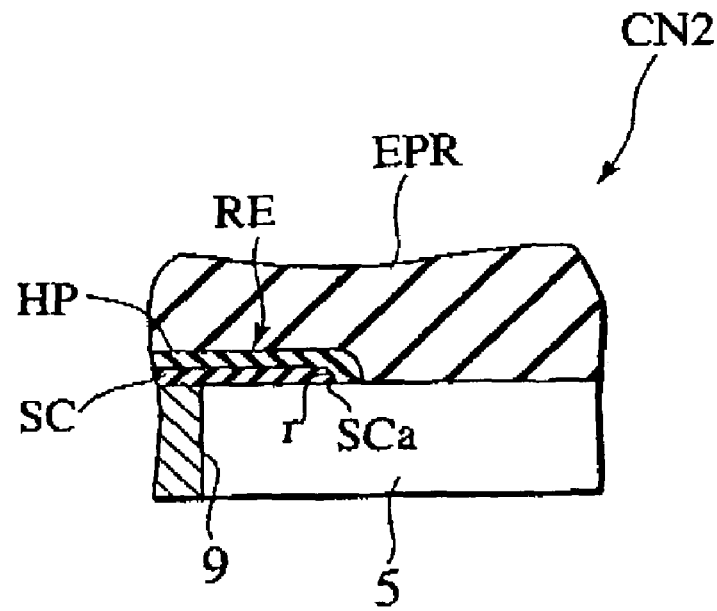
FIG. 4 is a section of a power cable connection structure including an electrode layer according to an embodiment of the invention.

FIG. 4 shows a connection structure CN2 for power cables including insulating members according to an embodiment of the invention. In this connection structure CN2, a rubber electrode layer RE, constituted as a sheet-shaped semi-conductive rubber layer SC covered at an outer periphery thereof with a high-permittivity rubber layer HP, is interposed between a rubber tape wound layer 9 of a power transmitting portion and a rubber layer EPR of an insulating portion, and extended on an outer periphery of a cable insulator 5, whereby it is allowed to terminate an end SCa of the semi-conductive rubber layer SC by an extremely small radius r.

Figure 5:
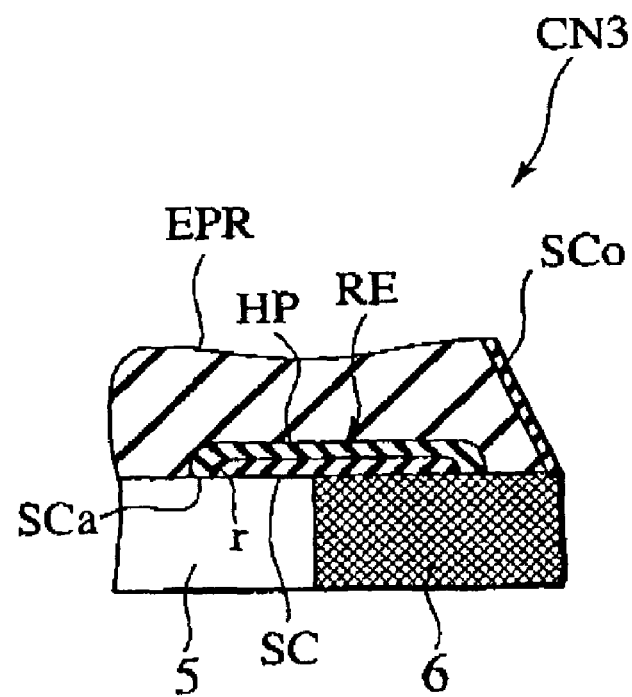
FIG. 5 is a section of a power cable connection structure including an electrode layer according to an embodiment of the invention.

FIG. 5 shows a connection structure CN3 for power cables including insulating members according to an embodiment of the invention. In this connection structure CN3, a rubber electrode layer RE, constituted as a sheet-shaped semi-conductive rubber layer SC covered at an outer periphery thereof with a high-permittivity rubber layer HP, is interposed between a cable screen 6 and a rubber layer EPR of an insulating portion, and extended on an outer periphery of a cable insulator 5, whereby, like the case of power transmitting portion described above, it is allowed to terminate an end SCa of the semi-conductive rubber layer SC by an extremely small radius r. Also the thickness of a semi-conductive rubber make outer electrode SCo can be extremely small.

For medium/high-voltage power XLPE cables, the radius r of termination can be preferably set to r=0.5 mm or more.

In the foregoing embodiments, the rubber material of insulating portion 14, that of semi-conductive rubber layer SC1 or SC of screening portion SH, and that ($M10_j$ in FIG. 1) of high-permittivity rubber layer HP1 or HP may preferably be identical in kind or type of rubber polymer ($M01_i$) and corresponding additives ($M12_{n,m}$).

As will be seen from the foregoing description, according to the invention, rubber compounds can be high of permittivity, to be over 10, 15, or 20 in relative permittivity, and free from degradation of electrical characteristics such as dielectric loss tangent, insulation breakdown voltage, and insulation resistance, allowing a desirable field effect moderating effect to be achieved.

Further, in termination of power cables, even with occurrences of singular points such as by projection, foreign material, or void, the electric field to be developed thereabout can be moderated by cable members according to the invention, with successful prevention against occurrences of defective events such as discharge, without needing a qualified skill.

While preferred embodiments of the present invention have been described using specific terms, such description is for illustrative purposes, and it is to be understood that changes and variations may be made without departing from the spirit or scope of the following claims.

What is claimed is:

1. A high-permittivity rubber compound produced by a process comprising:
    filling a filler to a base material, thereby producing a rubber compound having a high permittivity corresponding to a relative permittivity within a range over 10, wherein said base material comprises a crosslinkable rubber polymer;
    said filler comprises powder of a material of a barium titanate having a relative permittivity within a range over 2000 at temperatures between a room temperature and 90° C.; and
    wherein a Curie temperature of the material of the barium titanate has been shifted by addition of a shifter and the material has been washed with de-ionized water to remove ionic impurities.

2. A high-permittivity rubber compound according to claim 1, wherein the relative permittivity of the rubber compound resides within a range over 15.

3. A high-permittivity rubber compound according to claim 2, wherein the relative permittivity of the rubber compound resides within a range over 20.

4. A high-permittivity rubber compound according to claim 1, wherein:
    the crosslinkable rubber polymers in the rubber compound is crosslinked by a peroxide; and
    the rubber compound is thermally treated to remove a decomposition residue of the peroxide resulting from the crosslinking.

5. A power cable member comprising a high-permittivity rubber compound according to claim 1.

6. A power cable member comprising a high-permittivity rubber compound according to claim 2.

7. A power cable member comprising a high-permittivity rubber compound according to claim 3.

8. A power cable member comprising a high-permittivity rubber compound according to claim 4.

* * * * *